US008205066B2

(12) United States Patent
Brewer et al.

(10) Patent No.: US 8,205,066 B2
(45) Date of Patent: Jun. 19, 2012

(54) DYNAMICALLY CONFIGURED COPROCESSOR FOR DIFFERENT EXTENDED INSTRUCTION SET PERSONALITY SPECIFIC TO APPLICATION PROGRAM WITH SHARED MEMORY STORING INSTRUCTIONS INVISIBLY DISPATCHED FROM HOST PROCESSOR

(75) Inventors: Tony Brewer, Plano, TX (US); Steven J. Wallach, Dallas, TX (US)

(73) Assignee: Convey Computer, Richardson, TX (US)

( * ) Notice: Subject to any disclaimer, the term of this patent is extended or adjusted under 35 U.S.C. 154(b) by 676 days.

(21) Appl. No.: 12/263,203

(22) Filed: Oct. 31, 2008

(65) Prior Publication Data
US 2010/0115237 A1 May 6, 2010

(51) Int. Cl.
*G06F 15/16* (2006.01)
(52) U.S. Cl. .................. 712/34; 712/37; 712/E9.068
(58) Field of Classification Search .................. None
See application file for complete search history.

(56) References Cited

U.S. PATENT DOCUMENTS

| 4,128,880 A | 12/1978 | Cray, Jr. |
| 4,386,399 A | 5/1983 | Rasala et al. |
| 4,685,076 A | 8/1987 | Yoshida et al. |
| 4,817,140 A | 3/1989 | Chandra et al. |
| 4,897,783 A | 1/1990 | Nay |
| 5,027,272 A * | 6/1991 | Samuels ................... 712/225 |
| 5,109,499 A | 4/1992 | Inagami et al. |
| 5,202,969 A | 4/1993 | Sato et al. |
| 5,222,224 A | 6/1993 | Flynn et al. |
| 5,283,886 A | 2/1994 | Nishii et al. |
| 5,513,366 A | 4/1996 | Agarwal et al. |
| 5,598,546 A | 1/1997 | Blomgren |
| 5,752,035 A | 5/1998 | Trimberger |
| 5,838,984 A | 11/1998 | Nguyen et al. |
| 5,887,182 A | 3/1999 | Kinoshita et al. |
| 5,887,183 A | 3/1999 | Agarwal et al. |

(Continued)

FOREIGN PATENT DOCUMENTS
WO WO-2008/014494 1/2008

OTHER PUBLICATIONS

International Search Report and the Written Opinion issued for PCT/US2009/060820, dated Dec. 9, 2009, 8 pages.

(Continued)

*Primary Examiner* — Kenneth Kim
(74) *Attorney, Agent, or Firm* — Fulbright & Jaworski L.L.P.

(57) ABSTRACT

A co-processor is provided that comprises one or more application engines that can be dynamically configured to a desired personality. For instance, the application engines may be dynamically configured to any of a plurality of different vector processing instruction sets, such as a single-precision vector processing instruction set and a double-precision vector processing instruction set. The co-processor further comprises a common infrastructure that is common across all of the different personalities, such as an instruction decode infrastructure, memory management infrastructure, system interface infrastructure, and/or scalar processing unit (that has a base set of instructions). Thus, the personality of the co-processor can be dynamically modified (by reconfiguring one or more application engines of the co-processor), while the common infrastructure of the co-processor remains consistent across the various personalities.

44 Claims, 3 Drawing Sheets

U.S. PATENT DOCUMENTS

| | | | |
|---|---|---|---|
| 5,920,721 A | 7/1999 | Hunter et al. | |
| 5,935,204 A | 8/1999 | Shimizu et al. | |
| 5,937,192 A | 8/1999 | Martin | |
| 5,941,938 A | 8/1999 | Thayer | |
| 5,999,734 A | 12/1999 | Willis et al. | |
| 6,006,319 A | 12/1999 | Takahashi et al. | |
| 6,023,755 A | 2/2000 | Casselman | |
| 6,076,139 A | 6/2000 | Welker et al. | |
| 6,076,152 A | 6/2000 | Huppenthal et al. | |
| 6,097,402 A | 8/2000 | Case et al. | |
| 6,125,421 A | 9/2000 | Roy | |
| 6,154,419 A | 11/2000 | Shakkarwar | |
| 6,170,001 B1* | 1/2001 | Hinds et al. | 708/495 |
| 6,175,915 B1* | 1/2001 | Cashman et al. | 712/227 |
| 6,192,384 B1* | 2/2001 | Dally et al. | 708/200 |
| 6,195,676 B1 | 2/2001 | Spix et al. | |
| 6,202,133 B1 | 3/2001 | Jeddeloh | |
| 6,209,067 B1 | 3/2001 | Collins et al. | |
| 6,240,508 B1 | 5/2001 | Brown, III et al. | |
| 6,342,892 B1* | 1/2002 | Van Hook et al. | 345/503 |
| 6,434,687 B1 | 8/2002 | Huppenthal | |
| 6,473,831 B1 | 10/2002 | Schade | |
| 6,480,952 B2 | 11/2002 | Gorishek, IV et al. | |
| 6,611,908 B2 | 8/2003 | Lentz et al. | |
| 6,665,790 B1 | 12/2003 | Glossner, III et al. | |
| 6,684,305 B1* | 1/2004 | Deneau | 711/159 |
| 6,701,424 B1 | 3/2004 | Liao et al. | |
| 6,738,967 B1 | 5/2004 | Radigan | |
| 6,789,167 B2 | 9/2004 | Naffziger | |
| 6,831,979 B2 | 12/2004 | Callum | |
| 6,839,828 B2 | 1/2005 | Gschwind et al. | |
| 6,868,472 B1 | 3/2005 | Miyake et al. | |
| 6,891,543 B2 | 5/2005 | Wyatt | |
| 6,983,456 B2 | 1/2006 | Poznanovic et al. | |
| 7,000,211 B2 | 2/2006 | Arnold | |
| 7,120,755 B2 | 10/2006 | Jamil et al. | |
| 7,149,867 B2 | 12/2006 | Poznanovic et al. | |
| 7,167,971 B2* | 1/2007 | Asaad et al. | 712/34 |
| 7,225,324 B2 | 5/2007 | Huppenthal et al. | |
| 7,257,757 B2 | 8/2007 | Chun et al. | |
| 7,278,122 B2 | 10/2007 | Willis | |
| 7,328,195 B2 | 2/2008 | Willis | |
| 7,367,021 B2 | 4/2008 | Ansari et al. | |
| 7,376,812 B1 | 5/2008 | Snghavi et al. | |
| 7,421,565 B1 | 9/2008 | Kohn | |
| 7,546,441 B1* | 6/2009 | Ansari et al. | 712/220 |
| 7,577,822 B2 | 8/2009 | Vorbach | |
| 2001/0049816 A1 | 12/2001 | Rupp | |
| 2002/0046324 A1 | 4/2002 | Barroso et al. | |
| 2003/0005424 A1 | 1/2003 | Ansari et al. | |
| 2003/0140222 A1 | 7/2003 | Ohmi et al. | |
| 2003/0226018 A1 | 12/2003 | Tardo et al. | |
| 2004/0107331 A1 | 6/2004 | Baxter | |
| 2004/0117599 A1 | 6/2004 | Mittal et al. | |
| 2004/0193837 A1 | 9/2004 | Devaney et al. | |
| 2004/0193852 A1 | 9/2004 | Johnson | |
| 2004/0194048 A1 | 9/2004 | Arnold | |
| 2004/0215898 A1 | 10/2004 | Arimilli et al. | |
| 2004/0221127 A1 | 11/2004 | Ang | |
| 2004/0236920 A1 | 11/2004 | Sheaffer | |
| 2004/0243984 A1 | 12/2004 | Vorbach et al. | |
| 2004/0250046 A1 | 12/2004 | Gonzalez et al. | |
| 2005/0027970 A1 | 2/2005 | Arnold et al. | |
| 2005/0108503 A1 | 5/2005 | Sandon et al. | |
| 2005/0172099 A1 | 8/2005 | Lowe | |
| 2005/0188368 A1 | 8/2005 | Kinney | |
| 2005/0223369 A1 | 10/2005 | Chun et al. | |
| 2006/0075060 A1 | 4/2006 | Clark | |
| 2006/0149941 A1 | 7/2006 | Colavin et al. | |
| 2006/0259737 A1 | 11/2006 | Sachs et al. | |
| 2006/0288191 A1 | 12/2006 | Asaad et al. | |
| 2007/0005881 A1 | 1/2007 | Garney | |
| 2007/0005932 A1 | 1/2007 | Covelli et al. | |
| 2007/0038843 A1 | 2/2007 | Trivedi et al. | |
| 2007/0106833 A1 | 5/2007 | Rankin et al. | |
| 2007/0130445 A1 | 6/2007 | Lau et al. | |
| 2007/0153907 A1 | 7/2007 | Mehta et al. | |
| 2007/0157166 A1 | 7/2007 | Stevens | |
| 2007/0186210 A1 | 8/2007 | Hussain et al. | |
| 2007/0226424 A1 | 9/2007 | Clark et al. | |
| 2007/0245097 A1 | 10/2007 | Gschwind et al. | |
| 2007/0283336 A1 | 12/2007 | Gschwind et al. | |
| 2007/0288701 A1 | 12/2007 | Hofstee et al. | |
| 2007/0294666 A1 | 12/2007 | Papakipos et al. | |
| 2008/0059758 A1 | 3/2008 | Sachs | |
| 2008/0059759 A1 | 3/2008 | Sachs | |
| 2008/0059760 A1 | 3/2008 | Sachs | |
| 2008/0209127 A1 | 8/2008 | Brokenshire et al. | |
| 2008/0215854 A1 | 9/2008 | Asaad et al. | |
| 2009/0055596 A1 | 2/2009 | Wallach et al. | |
| 2009/0064095 A1 | 3/2009 | Wallach et al. | |

OTHER PUBLICATIONS

Vassiliadis et al., "The ARISE Reconfigurable Instruction Set Extension Framework", Jul. 16, 2007.

Gerald Estrin, "Organization of Computer Systems—The Fixed Plus Variable Structure Computer", 1960.

Hauck, S. "The Roles of FPGAs in Reprogrammable Systems", Proceedings of the IEEE, vol. 86, No. 4, 615-638, Apr. 1998.

Shirazi et al., "Run-Time Management of Dynamically Reconfigurable Designs", Field-Programmable Logic and Applications from FPGAs to Computing Paradigm, 1998.

Page, I., "Reconfigurable Processor Architectures", Microprocessors and Microsystems, vol. 20, Issue May 3, 1996, pp. 185-196.

Callahan et al., "The GARP Architecture and C Compiler", Computer, vol. 33, No. 4. pp. 62-69, Apr. 2000.

International Search Report and Written Opinion issued for PCT/US08/74566 dated Nov. 14, 2008, 9 pgs.

International Search Report and Written Opinion issued for PCT/US08/75828 dated Nov. 18, 2008, 12 pgs.

International Search Report and Written Opinion issued for PCT/US08/73423 dated Nov. 12, 2008, 12 pgs.

Arnold, Jeffrey M., "The Splash 2 Processor and Applications", 1993 IEEE, pp. 482-485.

Gokhale, Maya, "Reconfigurable Computing", Accelerating Computation with Field-Programmable Gate Arrays, © Springer, pp. 4 and 60-64, 2005.

Express Corporation, "XSA Board V1.1, V1.2 User Manual" (Release Date: Jun. 23, 2005).

Express, "XSA-50 Spartan-2 Prototyping Board with 2.5V, 50,000-gate FPGA" (copyright 1998-2008).

International Search Report and Written Opinion for PCT/US08/87233, dated Feb. 5, 2009, 11 pgs.

L.N. Bhuyan, "Lecture 15: Symmetric Multiprocessor: Cache Protocols", Feb. 28, 2001, 16 pgs.

Levine et al., "Efficient Application Representation for HASTE: Hybrid Architectures with a Single, Transformable Executable", 2003, 10 pgs.

Siewiorek, Daniel P.; Bell, Gordon C.; Newell, Allen; "Computer Structures: Principles and Examples" McGraw-Hill, 1982, p. 334, Figure 1(a).

Cray XD1™ FPGA Development, Release 1.2; S-6400-12, issued Apr. 18, 2005. Available at www.eng.uah.edu/~jacksoa/CrayXD1FPGADevelopment.pdf.

Callahan, Timothy J.; Hauser, John R.; Wawrzynek, John; "The Garp Architecture and C Compiler", IEEE Computer, vol. 33, No. 4, pp. 62-69, Apr. 2000.

Poster entitled GigaScale Mixed-Signal System Verification, FTL Systems, Inc. presented at the DARPA/MTO Team/NeoCAD2003 Fall Review, Sep. 15-17, 2003, Monterey, CA, a public unclassified meeting.

Poster entitled StarStream™ GigaScale Mixed-Signal System Verification, FTL Systems, Inc. presented at the DARPA/MTO Team/NeoCAD Program Review, Feb. 23, 2004, Scottsdale, AZ, Monterey, CA, a public unclassified meeting.

StarStream Design Summary; FTL Systems, Inc., available at Design Automation Conference (DAC), Jun. 2005, Anaheim, CA.

Gokhale, Maya; "Heterogeneous Processing", Los Alamos Computer Science Institute LACSI 2006, Oct. 17-19, 2006, Santa Fe, NM. Available at www.cct.lsu.edu/~estrabd/LACSI2006/workshops/workshop5/gokhale_mccormick.pdf.

The PC Guide, "The PC's x86 Instruction Set", 2004, www.pcguide.com/ref/cup.arch/int/instX86-c.html, 3 pgs.

Andreas Koch et al., "A Universal Co-Processor for Workstations", 1994, Abingdon EE&CS Books. 14 pgs.

International Search Report and the Written Opinion issued for PCT/US2009/060811, dated Dec. 1, 2009, 7 pages.

Belgard, Rich, "Reconfigurable Illogic", Microprocessor, The Insiders Guide to Microprocessor Hardware, May 10, 2004, 4 pgs.

Trednnick, Nick et al., "Microprocessor Sunset", Microprocessor, The Insiders Guide to Microprocessor Hardware, May 3, 2004, 4 pgs.

* cited by examiner

DYNAMICALLY CONFIGURED COPROCESSOR FOR DIFFERENT EXTENDED INSTRUCTION SET PERSONALITY SPECIFIC TO APPLICATION PROGRAM WITH SHARED MEMORY STORING INSTRUCTIONS INVISIBLY DISPATCHED FROM HOST PROCESSOR

CROSS-REFERENCE TO RELATED APPLICATIONS

The present application relates generally to the following co-pending and commonly-assigned U.S. Patent Applications: 1) U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", 2) U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", 3) U.S. patent application Ser. No. 11/847,169 filed Aug. 29, 2007 titled "COMPILER FOR GENERATING AN EXECUTABLE COMPRISING INSTRUCTIONS FOR A PLURALITY OF DIFFERENT INSTRUCTION SETS", 4) U.S. patent application Ser. No. 11/969,792 filed Jan. 4, 2008 titled "MICROPROCESSOR ARCHITECTURE HAVING ALTERNATIVE MEMORY ACCESS PATHS", 5) U.S. patent application Ser. No. 12/186,344 filed Aug. 5, 2008 titled "MEMORY INTERLEAVE FOR HETEROGENEOUS COMPUTING", 6) U.S. patent application Ser. No. 12/186,372 filed Aug. 5, 2008 titled "MULTIPLE DATA CHANNEL MEMORY MODULE ARCHITECTURE", and 7) concurrently-filed U.S. patent application Ser. No. 12/263,232 titled "DYNAMICALLY-SELECTABLE VECTOR REGISTER PARTITIONING", the disclosures of which are hereby incorporated herein by reference.

TECHNICAL FIELD

The following description relates generally to dynamically-reconfigurable processors, and more specifically to a co-processor infrastructure that supports dynamically-modifiable personalities, particularly dynamically-modifiable vector processing personalities.

BACKGROUND AND RELATED ART

1. Background

The popularity of computing systems continues to grow and the demand for improved processing architectures thus likewise continues to grow. Ever-increasing desires for improved computing performance and efficiency has led to various improved processor architectures. For example, multi-core processors are becoming more prevalent in the computing industry and are being used in various computing devices, such as servers, personal computers (PCs), laptop computers, personal digital assistants (PDAs), wireless telephones, and so on.

In the past, processors such as CPUs (central processing units) featured a single execution unit to process instructions of a program. More recently, computer systems are being developed with multiple processors in an attempt to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve performance of a variety of applications.

A multi-core CPU combines two or more independent cores into a single package comprised of a single piece silicon integrated circuit (IC), called a die. In some instances, a multi-core CPU may comprise two or more dies packaged together. A dual-core device contains two independent microprocessors and a quad-core device contains four microprocessors. Cores in a multi-core device may share a single coherent cache at the highest on-device cache level (e.g., L2 for the Intel® Core 2) or may have separate caches (e.g. current AMD® dual-core processors). The processors also share the same interconnect to the rest of the system. Each "core" may independently implement optimizations such as superscalar execution, pipelining, and multithreading. A system with A cores is typically most effective when it is presented with N or more threads concurrently.

One processor architecture that has been developed utilizes multiple processors (e.g., multiple cores), which are homogeneous. The processors are homogeneous in that they are all implemented with the same fixed instruction sets (e.g., Intel's x86 instruction set, AMD's Opteron instruction set, etc.). Further, the homogeneous processors access memory in a common way, such as all of the processors being cache-line oriented such that they access a cache block (or "cache line") of memory at a time.

In general, a processor's instruction set refers to a list of all instructions, and all their variations, that the processor can execute. Such instructions may include, as examples, arithmetic instructions, such as ADD and SUBTRACT; logic instructions, such as AND, OR, and NOT; data instructions, such as MOVE, INPUT, OUTPUT, LOAD, and STORE; and control flow instructions, such as GOTO, if X then GOTO, CALL, and RETURN. Examples of well-known instruction sets include x86 (also known as IA-32), x86-64 (also known as AMD64 and Intel® 64), AMD's Opteron, VAX (Digital Equipment Corporation), IA-64 (Itanium), and PA-RISC (HP Precision Architecture).

Generally, the instruction set architecture is distinguished from the microarchitecture, which is the set of processor design techniques used to implement the instruction set. Computers with different microarchitectures can share a common instruction set. For example, the Intel® Pentium and the AMD® Athlon implement nearly identical versions of the x86 instruction set, but have radically different internal microarchitecture designs. In all these cases the instruction set (e.g., x86) is fixed by the manufacturer and directly hardware implemented, in a semiconductor technology, by the microarchitecture. Consequently, the instruction set is traditionally fixed for the lifetime of this implementation.

Figure 1:
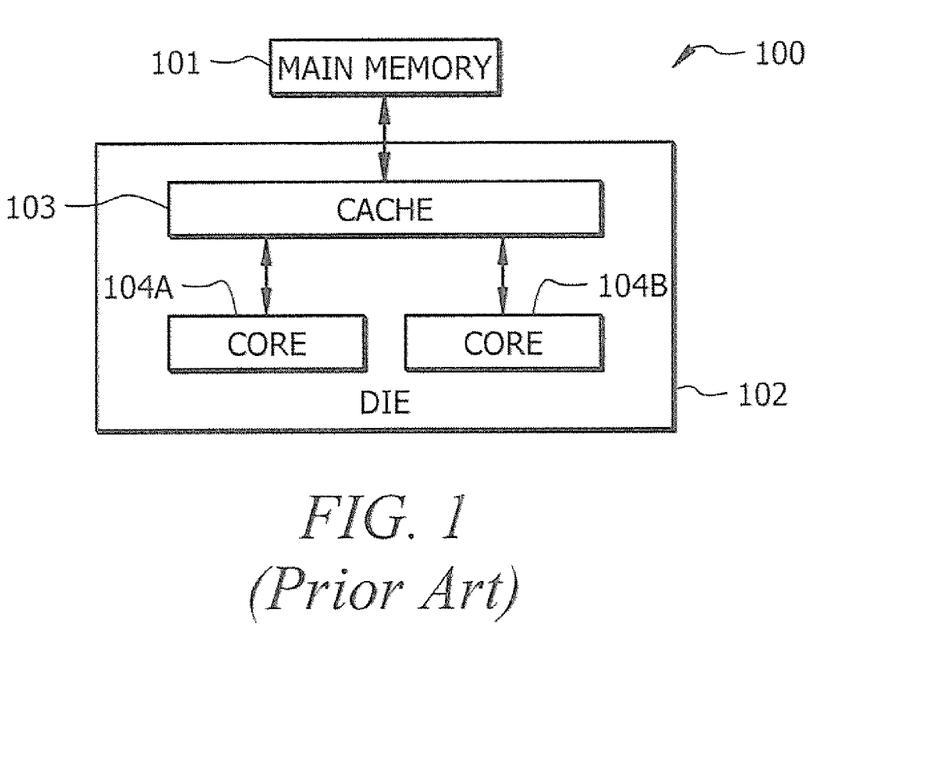
FIG. 1 shows an exemplary prior art multi-processor system employing a plurality of homogeneous processors.

FIG. 1 shows a block-diagram representation of an exemplary prior art system 100 in which multiple homogeneous processors (or cores) are implemented. System 100 comprises two subsystems: 1) a main memory (physical memory) subsystem 101 and 2) a processing subsystem 102 (e.g., a multi-core die). System 100 includes a first microprocessor core 104A and a second microprocessor core 104B. In this example, microprocessor cores 104A and 104B are homogeneous in that they are each implemented to have the same, fixed instruction set, such as x86. In addition, each of the homogeneous microprocessor cores 104A and 104B access main memory 101 in a common way, such as via cache block accesses, as discussed hereafter. Further, in this example, cores 104A and 104B are implemented on a common die 102. Main memory 101 is communicatively connected to processing subsystem 102. Main memory 101 comprises a common physical address space that microprocessor cores 104A and 104B can each reference.

As shown further in FIG. 1, a cache 103 is also implemented on die 102. Cores 104A and 104B are each communicatively coupled to cache 103. As is well known, a cache generally is memory for storing a collection of data duplicating original values stored elsewhere (e.g., to main memory 101) or computed earlier, where the original data is expensive to fetch (due to longer access time) or to compute, compared to the cost of reading the cache. In other words, a cache 103 generally provides a temporary storage area where frequently accessed data can be stored for rapid access. Once the data is stored in cache 103, future use can be made by accessing the cached copy rather than re-fetching the original data from main memory 101, so that the average access time is shorter. In many systems, cache access times are approximately 50 times faster than similar accesses to main memory 101. Cache 103, therefore, helps expedite data access that the microcores 104A and 104B would otherwise have to fetch from main memory 101.

In many system architectures, each core 104A and 104B will have its own cache also, commonly called the "L1" cache, and cache 103 is commonly referred to as the "L2" cache. Unless expressly stated herein, cache 103 generally refers to any level of cache that may be implemented, and thus may encompass L1, L2, etc. Accordingly, while shown for ease of illustration as a single block that is accessed by both of cores 104A and 104B, cache 103 may include L1 cache that is implemented for each core.

In many system architectures, virtual addresses are utilized. In general, a virtual address is an address identifying a virtual (non-physical) entity. As is well-known in the art, virtual addresses may be utilized for accessing memory. Virtual memory is a mechanism that permits data that is located on a persistent storage medium (e.g., disk) to be referenced as if the data was located in physical memory. Translation tables, maintained by the operating system, are used to determine the location of the reference data (e.g., disk or main memory). Program instructions being executed by a processor may refer to a virtual memory address, which is translated into a physical address. To minimize the performance penalty of address translation, most modern CPUs include an on-chip Memory Management Unit (MMU), and maintain a table of recently used virtual-to-physical translations, called a Translation Look-aside Buffer (TLB). Addresses with entries in the TLB require no additional memory references (and therefore time) to translate. However, the TLB can only maintain a fixed number of mappings between virtual and physical addresses; when the needed translation is not resident in the TLB, action will have to be taken to load it in.

In some architectures, special-purpose processors that are often referred to as "accelerators" are also implemented to perform certain types of operations. For example, a processor executing a program may offload certain types of operations to an accelerator that is configured to perform those types of operations efficiently. Such hardware acceleration employs hardware to perform some function faster than is possible in software running on the normal (general-purpose) CPU. Hardware accelerators are generally designed for computationally intensive software code. Depending upon granularity, hardware acceleration can vary from a small function unit to a large functional block like motion estimation in MPEG2. Examples of such hardware acceleration include blitting acceleration functionality in graphics processing units (GPUs) and instructions for complex operations in CPUs. Such accelerator processors generally have a fixed instruction set that differs from the instruction set of the general-purpose processor, and the accelerator processor's local memory does not maintain cache coherency with the general-purpose processor.

A graphics processing unit (GPU) is a well-known example of an accelerator. A GPU is a dedicated graphics rendering device commonly implemented for a personal computer, workstation, or game console. Modern GPUs are very efficient at manipulating and displaying computer graphics, and their highly parallel structure makes them more effective than typical CPUs for a range of complex algorithms. A GPU implements a number of graphics primitive operations in a way that makes running them much faster than drawing directly to the screen with the host CPU. The most common operations for early two-dimensional (2D) computer graphics include the BitBLT operation (combines several bitmap patterns using a RasterOp), usually in special hardware called a "blitter", and operations for drawing rectangles, triangles, circles, and arcs. Modern GPUs also have support for three-dimensional (3D) computer graphics, and typically include digital video-related functions.

Thus, for instance, graphics operations of a program being executed by host processors 104A and 104B may be passed to a GPU. While the homogeneous host processors 104A and 104B maintain cache coherency with each other, as discussed above with FIG. 1, they do not maintain cache coherency with accelerator hardware of the GPU. In addition, the GPU accelerator does not share the same physical or virtual address space of processors 104A and 104B.

In multi-processor systems, such as exemplary system 100 of FIG. 1, one or more of the processors may be implemented as a vector processor. In general, vector processors are processors which provide high level operations on vectors—that is, linear arrays of data. As one example, a typical vector operation might add two 64-entry, floating point vectors to obtain a single 64-entry vector. In effect, one vector instruction is generally equivalent to a loop with each iteration computing one of the 64 elements of the result, updating all the indices and branching back to the beginning. Vector operations are particularly useful for certain types of processing, such as image processing or processing of certain scientific or engineering applications where large amounts of data is desired to be processed in generally a repetitive manner. In a vector processor, the computation of each result is generally independent of the computation of previous results, thereby allowing a deep pipeline without generating data dependencies or conflicts. In essence, the absence of data dependencies is determined by the particular application to which the vector processor is applied, or by the compiler when a particular vector operation is specified. Traditional vector processors typically include a pipeline scalar unit together with a vector unit. In vector-register processors, the vector operations, except loads and stores, use the vector registers.

In most systems, memory 101 may hold both programs and data. Each has unique characteristics pertinent to memory performance. For example, when a program is being executed, memory traffic is typically characterized as a series of sequential reads. On the other hand, when a data structure is being accessed, memory traffic is usually characterized by a stride, i.e., the difference in address from a previous access. A stride may be random or fixed. For example, repeatedly accessing a data element in an array may result in a fixed stride of two. As is well-known in the art, a lot of algorithms have a power of 2 stride. Accordingly, without some memory interleave management scheme being employed, hot spots may be encountered within the memory in which a common portion of memory (e.g., a given bank of memory) is accessed much more often than other portions of memory.

As is well-known in the art, memory is often arranged into independently controllable arrays, often referred to as "memory banks." Under the control of a memory controller, a bank can generally operate on one transaction at a time. The memory may be implemented by dynamic storage technology (such as "DRAMS"), or of static RAM technology. In a typical DRAM chip, some number (e.g., 4, 8, and possibly 16) of banks of memory may be present. A memory interleaving scheme may be desired to minimize one of the banks of memory from being a "hot spot" of the memory.

As discussed above, many compute devices, such as the Intel x86 or AMD x86 microprocessors, are cache-block oriented. Today, a cache block of 64 bytes in size is typical, but compute devices may be implemented with other cache block sizes. A cache block is typically contained all on a single hardware memory storage element, such as a single dual in-line memory module (DIMM). As discussed above, when the cache-block oriented compute device accesses that DIMM, it presents one address and is returned the entire cache-block (e.g., 64 bytes).

Some compute devices, such as certain accelerator compute devices, may not be cache-block oriented. That is, those non-cache-block oriented compute devices may access portions of memory (e.g., words) on a much smaller, finer granularity than is accessed by the cache-block oriented compute devices. For instance, while a typical cache-block oriented compute device may access a cache block of 64 bytes for a single memory access request, a non-cache-block oriented compute device may access a Word that is 8 bytes in size in a single memory access request. That is, the non-cache-block oriented compute device in this example may access a particular memory DIMM and only obtain 8 bytes from a particular address present in that DIMM.

As discussed above, traditional multi-processor systems have employed homogeneous compute devices (e.g., processor cores 104A and 104B of FIG. 1) that each access memory 101 in a common manner, such as via cache-block oriented accesses. While some systems may further include certain heterogeneous compute elements, such as accelerators (e.g., a GPU), the heterogeneous compute element does not share the same physical or virtual address space of the homogeneous compute elements.

2. Related Art

More recently, some systems have been developed that include heterogeneous compute elements. For instance, the above-identified related U.S. patent applications (the disclosures of which are incorporated herein by reference) disclose various implementations of exemplary heterogeneous computing architectures. In certain implementations, the architecture comprises a multi-processor system having at least one host processor and one or more heterogeneous co-processors. Further, in certain implementations, at least one of the heterogeneous co-processors may be dynamically reconfigurable to possess any of various different instruction sets. The host processor(s) may comprise a fixed instruction set, such as the well-known x86 instruction set, while the co-processor(s) may comprise dynamically reconfigurable logic that enables the co-processor's instruction set to be dynamically reconfigured. In this manner, the host processor(s) and the dynamically reconfigurable co-processor(s) are heterogeneous processors because the dynamically reconfigurable co-processor(s) may be configured to have a different instruction set than that of the host processor(s).

According to certain embodiments, the co-processor(s) may be dynamically reconfigured with an instruction set for use in optimizing performance of a given executable. For instance, in certain embodiments, one of a plurality of pre-defined instruction set images may be loaded onto the co-processor(s) for use by the co-processor(s) in processing a portion of a given executable's instruction stream. Thus, certain instructions being processed for a given application may be off-loaded (or "dispatched") from the host processor(s) to the heterogeneous co-processor(s) which may be configured to process the off-loaded instructions in a more efficient manner.

Thus, in certain implementations, the heterogeneous co-processor(s) comprise a different instruction set than the native instruction set of the host processor(s). Further, in certain embodiments, the instruction set of the heterogeneous co-processor(s) may be dynamically reconfigurable. As an example, in one implementation at least three (3) mutually-exclusive instruction sets may be pre-defined, any of which may be dynamically loaded to a dynamically-reconfigurable heterogeneous co-processor. As an illustrative example, a first pre-defined instruction set might be a vector instruction set designed particularly for processing 64-bit floating point operations as are commonly encountered in computer-aided simulations; a second pre-defined instruction set might be designed particularly for processing 32-bit floating point operations as are commonly encountered in signal and image processing applications; and a third pre-defined instruction set might be designed particularly for processing cryptography-related operations. While three illustrative pre-defined instruction sets are mention above, it should be recognized that embodiments of the present invention are not limited to the exemplary instruction sets mentioned above. Rather, any number of instruction sets of any type may be pre-defined in a similar manner and may be employed on a given system in addition to or instead of one or more of the above-mentioned pre-defined instruction sets.

In certain implementations, the heterogeneous compute elements (e.g., host processor(s) and co-processor(s)) share a common physical and/or virtual address space of memory. As an example, a system may comprise one or more host processor(s) that are cache-block oriented, and the system may further comprise one or more compute elements co-processor(s) that are non-cache-block oriented. For instance, the cache-block oriented compute element(s) may access main memory in cache blocks of, say, 64 bytes per request, whereas the non-cache-block oriented compute element(s) may access main memory via smaller-sized requests (which may be referred to as "sub-cache-block" requests), such as 8 bytes per request.

One exemplary heterogeneous computing system that may include one or more cache-block oriented compute elements and one or more non-cache-block oriented compute elements is that disclosed in co-pending U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", the disclosure of which is incorporated herein by reference. For instance, in such a heterogeneous computing system, one or more host processors may be cache-block oriented, while one or more of the dynamically-reconfigurable co-processor(s) may be non-cache-block oriented, and the heterogeneous host processor(s) and co-processor(s) share access to the common main memory (and share a common physical and virtual address space of the memory).

Another exemplary heterogeneous computing system is that disclosed in co-pending U.S. patent application Ser. No. 11/969,792 filed Jan. 4, 2008 titled "MICROPROCESSOR ARCHITECTURE HAVING ALTERNATIVE MEMORY ACCESS PATHS" (hereinafter "the '792 application"), the disclosure of which is incorporated herein by reference. In particular, the '792 application discloses an exemplary heterogeneous compute system in which one or more compute elements (e.g., host processors) are cache-block oriented and one or more heterogeneous compute elements (e.g., co-processors) are sub-cache-block oriented to access data at a finer granularity than the cache block.

While the above-referenced related applications describe exemplary heterogeneous computing systems in which embodiments of the present invention may be implemented, the concepts presented herein are not limited in application to those exemplary heterogeneous computing systems but may likewise be employed in other systems/architectures.

SUMMARY

Thus, exemplary systems such as those disclosed in the above-referenced U.S. patent applications have been developed that include one or more dynamically-reconfigurable co-processors, and any of various different personalities can be loaded onto the configurable part of the co-processor(s). In this context, a "personality" generally refers to a set of instructions recognized by the co-processor.

The present invention is directed generally to a co-processor infrastructure that supports dynamically-modifiable personalities. In particular, certain embodiments provide a co-processor infrastructure that supports dynamically-modifiable vector processing personalities.

According to embodiments of the present invention, a co-processor is provided that includes one or more application engines that are dynamically configurable to any of a plurality of different personalities. For instance, the application engine(s) may comprise one or more reconfigurable function units (e.g., the reconfigurable function units may be implemented with FPGAs, etc.) that can be dynamically configured to implement a desired extended instruction set.

The co-processor also comprises an infrastructure that is common to all the different personalities (e.g., different vector processing personalities) to which application engines may be configured. In certain embodiments, the infrastructure comprises an instruction decode infrastructure that is common across all of the personalities. In certain embodiments, the infrastructure comprises a memory management infrastructure that is common across all of the personalities. Such memory management infrastructure may comprise a virtual memory and/or physical memory infrastructure that is common across all of the personalities. For instance, in certain embodiments the physical memory infrastructure, such as DDR2 SDRAM (double-data-rate two synchronous dynamic random access memory), number of read and write points, etc., remains common across all of the personalities. Further, the methods of accessing physical memory (after virtual memory translation) remain common across all of the personalities. In certain embodiments, the infrastructure comprises a system interface infrastructure (e.g., for interfacing with a host processor) that is common across all of the personalities. In certain embodiments, the infrastructure comprises a scalar processing unit having a base set of instructions that are common across all of the personalities. All or any combination of (e.g., any one or more of) an instruction decode infrastructure, memory management infrastructure, system interface infrastructure, and scalar processing unit may be implemented to be common across all of the personalities in a given co-processor in accordance with embodiments of the present invention.

Accordingly, embodiments of the present invention provide a co-processor that comprises one or more application engines that can be dynamically configured to a desired personality. The co-processor further comprises a common infrastructure that is common across all of the personalities, such as an instruction decode infrastructure, memory management infrastructure, system interface infrastructure, and/or scalar processing unit (that has a base set of instructions). Thus, the personality of the co-processor can be dynamically modified (by reconfiguring one or more application engines of the co-processor), while the common infrastructure of the co-processor remains consistent across the various personalities.

In certain implementations, the personality of a dynamically-reconfigurable co-processor can be modified by loading different extensions (or "extended instructions") to a base set of instructions. For instance, in one implementation, a canonical set of instructions is implemented in the co-processor (e.g., in a scalar processing unit of the co-processor), and those canonical instructions provide a base set of instructions that remain present on the co-processor no matter what further personality or extended instructions are loaded onto the co-processor. Such canonical instructions may include scalar loads, scalar stores, branch, shift, loop, and/or other types of instructions that are desired to be available in all personalities.

According to certain embodiments, the co-processor supports at least two dynamically-configurable general-purpose vector processing personalities. In general, a vector processing personality refers to a personality (i.e., a set of instructions recognized by the co-processor) that includes specific instructions for vector operations. The first general-purpose vector processing personality to which the co-processor may be configured is referred to as single precision vector (SPV), and the second general-purpose vector processing personality to which the co-processor may be configured is referred to as double precision vector (DPV).

For different markets or different types of applications, specific extensions of the canonical instructions may be developed to be efficient at solving a particular problem for the corresponding market. Thus, a corresponding "personality" may be developed for a given type of application. As an example, many seismic data processing applications (e.g., "oil and gas" applications) require single-precision type vector processing operations, while many financial applications require double-precision type vector processing operations (e.g., financial applications commonly need special instructions to be able to do intrinsics, log, exponential, cumulative distribution function, etc.). Thus, a SPV personality may be provided for use by the co-processor in processing applications that desire single-precision type vector processing operations (e.g., seismic data processing applications), and a DPV personality may be provided for use by the co-processor in processing applications that desire double-precision type vector processing operations (e.g., financial applications).

Depending on the type of application being executed at a given time, the co-processor may be dynamically configured to possess the desired vector processing personality. As one example, upon starting execution of an application that desires a SPV personality, the co-processor may be checked to determine whether it possesses the desired SPV personality, and if it does not, it may be dynamically configured with the SPV personality for use in executing at least a portion of the operations desired in executing the application. Thereafter, upon starting execution of an application that desires a DPV personality, the co-processor may be dynamically reconfigured to possess the DPV personality for use in executing at least a portion of the operations desired in executing that application. In certain embodiments, the personality of the co-processor may even be dynamically modified during execution of a given application. For instance in certain embodiments, the co-processor's personality may be configured to a first personality (e.g., SPV personality) for execution of a portion of the operations desired by an executing application, and then the co-processor's personality may be dynamically reconfigured to another personality (e.g., DPV personality) for execution of a different portion of the operations desired by an executing application. The co-processor can be dynamically configured to possess a desired personality for optimally supporting operations (e.g., accurately, efficiently, etc.) of an executing application. For example, the co-processor may be dynamically configured to possess a SPV personality, and then may later be dynamically reconfigured to possess a DPV personality or other desired personality, such as an optimized integer *2 (16 bit) personality.

In one embodiment, the various vector processing personalities to which the co-processor can be configured provide extensions to the canonical ISA (instruction set architecture) that support vector oriented operations. The SPV and DPV personalities are appropriate for single and double precision workloads, respectively, with data organized as single or multi-dimensional arrays. Thus, according to one embodiment of the present invention, a co-processor is provided that has an infrastructure that can be leveraged across various different vector processing personalities, which may be achieved by dynamically modifying function units of the co-processor, as discussed further herein.

While SPV and DPV are two exemplary vector processing personalities to which the co-processor may be dynamically configured to possess in certain embodiments, the scope of the present invention is not limited to those exemplary vector processing personalities; but rather the co-processor may be similarly dynamically reconfigured to any number of other vector processing personalities (and/or non-vector processing personalities that do not comprise instructions for vector oriented operations) in addition to or instead of SPV and DPV in accordance with embodiments of the present invention.

According to one embodiment, a co-processor comprises at least one application engine having at least one configurable function unit that is configurable to any of a plurality of different application-specific personalities. The co-processor also comprises an infrastructure that is common to all the plurality of different application-specific personalities. For instance, the co-processor may comprise a memory management infrastructure that is common to all the plurality of different application-specific personalities. Such memory management infrastructure may comprise a virtual memory and/or physical memory infrastructure that is common across all of the personalities. As another example, the co-processor may comprise a system interface infrastructure for interfacing with a host processor, wherein the system interface infrastructure is common to all the plurality of different application-specific personalities. In certain embodiments, the application-specific personalities are vector processing personalities, such as SPV or DPV.

According to another embodiment, a system for processing data comprises at least one application engine having at least one configurable function unit that is configurable to any of a plurality of different application-specific personalities. The system further comprises a virtual memory and instruction decode infrastructure that is common to all of the plurality of different application-specific personalities. Again, the application-specific personalities to which the function unit may be configured may comprise vector processing personalities, such as SPV or DPV.

According to one embodiment, a method for processing data comprises configuring an existing virtual memory and instruction decode infrastructure that is common to a plurality of personalities with application-specific function units. The method may further comprise receiving reconfiguration information pertaining to a desired application-specific personality. The reconfiguration information may be received dynamically during execution of an application for which the application-specific personality is desired. In certain embodiments, the function units are compatible with the framework of the infrastructure including virtual memory, instruction structure and a register structure. And, the application-specific personalities to which the function units may be configured may comprise vector processing personalities, such as SPV or DPV.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings in which.

DETAILED DESCRIPTION

Figure 2:
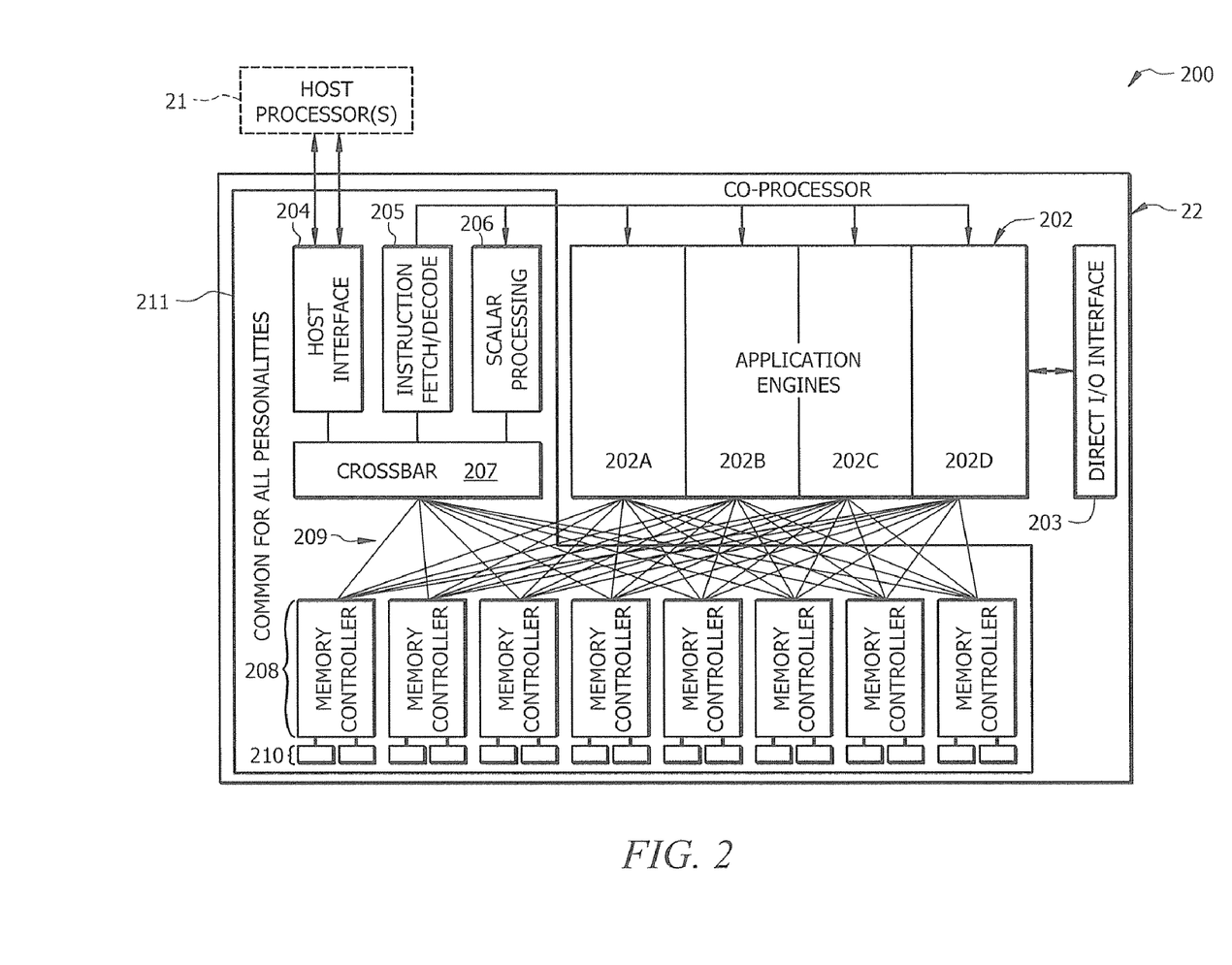
FIG. 2 shows an exemplary multi-processor system according to one embodiment of the present invention, wherein a co-processor comprises one or more application engines that are dynamically configurable to any of a plurality of different personalities (e.g., vector processing personalities)

FIG. 2 shows an exemplary multi-processor system 200 according to one embodiment of the present invention. Exemplary system 200 comprises a plurality of processors, such as one or more host processors 21 and one or more co-processors 22. As disclosed in the related U.S. patent applications referenced herein above, the host processor(s) 21 may comprise a fixed instruction set, such as the well-known x86 instruction set, while the co-processor(s) 22 may comprise dynamically reconfigurable logic that enables the co-processor's instruction set to be dynamically reconfigured. Of course, embodiments of the present invention are not limited to any specific instruction set that may be implemented on host processor(s) 21. FIG. 2 further shows, in block-diagram form, an exemplary architecture of co-processor 22 that may be implemented in accordance with one embodiment of the present invention.

It should be recognized that embodiments of the present invention may be adapted to any appropriate scale or granularity within a given system. For instance, a host processor(s) 21 and co-processor(s) 22 may be implemented as separate processors (e.g., which may be implemented on separate integrated circuits). In other architectures, such host processor(s) 21 and co-processor(s) 22 may be implemented within a single integrated circuit (i.e., the same physical die).

While one co-processor 22 is shown for ease of illustration in FIG. 2, it should be recognized that any number of such co-processors may be implemented in accordance with embodiments of the present invention, each of which may be dynamically reconfigurable to possess any of a plurality of different personalities (wherein the different co-processors may be configured with the same or with different personalities). For instance, two or more co-processors 22 may be configured with different personalities (instruction sets) and may each be used for processing instructions from a common executable (application). For example, an executable may designate a first instruction set to be configured onto a first of the co-processors and a second instruction set to be configured onto a second of the co-processors, wherein a portion of the executable's instruction stream may be processed by the host processor 21 while other portions of the executable's instruction stream may be processed by the first and second co-processors.

In the exemplary architecture shown in FIG. 2, co-processor 22 comprises one or more application engines 202 that have dynamically-reconfigurable personalities, and co-processor 22 further comprises an infrastructure 211 that is common to all of the different personalities to which application engines 202 may be configured. Exemplary embodiments of application engines 202 and infrastructure 211 are described further herein.

In the illustrative example of FIG. 2, co-processor 22 includes four application engines 202A-202D. While four application engines are shown in this illustrative example, the scope of the present invention is not limited to any specific number of application engines; but rather any number (one or more) of application engines may be implemented in a given co-processor in accordance with embodiments of the present invention. Each application engine 202A-202D is dynamically reconfigurable with any of various different personalities, such as by loading the application engine with an extended instruction set. Each application engine 202A-202D is operable to process instructions of an application (e.g., instructions of an application that have been dispatched from the host processor 21 to the co-processor 22) in accordance with the specific personality (e.g., extended instruction set) with which the application engine has been configured. The application engines 202 may comprise dynamically reconfigurable logic, such as field-programmable gate arrays (FPGAs), that enable a different personality to be dynamically loaded onto the application engine. Exemplary techniques that may be employed in certain embodiments for dynamically reconfiguring a co-processor (e.g., application engine) with a desired personality (instruction set) are described further in the above-referenced U.S. patent applications, the disclosures of which are incorporated herein by reference.

As discussed in U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", the disclosure of which has been incorporated herein by reference, in certain embodiments the co-processor may be dynamically reconfigured with a desired personality (e.g., having an extended instruction set) by loading such personality/extended instruction set to the co-processor from persistent data storage. In certain embodiments, a plurality of mutually exclusive instruction sets (or "personalities") may be stored to persistent data storage, and any of those personalities may be loaded (in its entirety) to the co-processor (e.g., to the reconfigurable application engine) during system run-time. Such personalities may be stored as separate data files from the executable file, such as shown in FIG. 5 of U.S. patent application Ser. No. 11/854,432.

As discussed above, in this context a "personality" generally refers to a set of instructions recognized by the application engine 202. In certain implementations, the personality of a dynamically-reconfigurable application engine 202 can be modified by loading different extensions (or "extended instructions") thereto in order to supplement or extend a base set of instructions. For instance, in one implementation, a canonical (or "base") set of instructions is implemented in the co-processor (e.g., in scalar processing unit 206), and those canonical instructions provide a base set of instructions that remain present on the co-processor 22 no matter what further personality or extended instructions are loaded onto the application engines 202. As noted above, for different markets or types of applications, specific extensions of the canonical instructions may be desired in order to improve efficiency and/or other characteristics of processing the application being executed. Thus, for instance, different extended instruction sets may be developed to be efficient at solving particular problems for various types of applications. As an example, many seismic data processing applications require single-precision type vector processing operations, while many financial applications require double-precision type vector processing operations. Scalar processing unit 206 may provide a base set of instructions (a base ISA) that are available across all personalities, while any of various different personalities (or extended instruction sets) may be dynamically loaded onto the application engines 202 in order to configure the co-processor 22 optimally for a given type of application being executed.

In the example of FIG. 2, infrastructure 211 of co-processor 22 includes host interface 204, instruction fetch/decode unit 205, scalar processing unit 206, crossbar 207, communication paths (bus) 209, memory controllers 208, and memory 210. Host interface 204 is used to communicate with the host processor(s) 21. In certain embodiments, host interface 204 may deal with dispatch requests for receiving instructions dispatched from the host processor(s) for processing by co-processor 22. Further, in certain embodiments, host interface 204 may receive memory interface requests between the host processor(s) 21 and the co-processor memory 210 and/or between the co-processor 22 and the host processor memory. Host interface 204 is connected to crossbar 207, which acts to communicatively interconnect various functional blocks, as shown.

When co-processor 22 is executing instructions, instruction fetch decode unit 205 fetches those instructions from memory and decodes them. Instruction fetch/decode unit 205 may then send the decoded instructions to the application engines 202 or to the scalar processing unit 206.

Scalar processing unit 206, in this exemplary embodiment, is where the canonical, base set of instructions are executed. While one scalar processing unit is shown in this illustrative example, the scope of the present invention is not limited to one scalar processing unit; but rather any number (one or more) of scalar processing units may be implemented in a given co-processor in accordance with embodiments of the present invention. Scalar processing unit 206 is also connected to the crossbar 207 so that the canonical loads and stores can go either through the host interface 204 to the host processor(s) memory or through the crossbar 207 to the co-processor memory 210.

In this exemplary embodiment, co-processor 22 further includes one or more memory controllers 208. While eight memory controllers 208 are shown in this illustrative example, the scope of the present invention is not limited to any specific number of memory controllers; but rather any number (one or more) of memory controllers may be implemented in a given co-processor in accordance with embodiments of the present invention. In this example, memory controllers 208 perform the function of receiving a memory request from either the application engines 202 or the crossbar 207, and the memory controller then performs a translation from virtual address to physical address and presents the request to the memory 210 themselves.

Memory 210, in this example, comprises a suitable data storage mechanism examples of which include, but are not limited to, either a standard dual in-line memory module (DIMM) or a multi-data channel DIMM such as that described further in co-pending and commonly-assigned U.S. patent application Ser. No. 12/186,372 filed Aug. 5, 2008 titled "MULTIPLE DATA CHANNEL MEMORY MODULE ARCHITECTURE." the disclosure of which is hereby incorporated herein by reference. While a pair of memory modules are shown as associated with each of the eight memory controllers 208 for a total of sixteen memory modules forming memory 210 in this illustrative example, the scope of the present invention is not limited to any specific number of memory modules; but rather any number (one or more) of memory modules may be associated with each memory controller for a total of any number (one or more) memory modules that may be implemented in a given co-processor in accordance with embodiments of the present invention. Communication links (or paths) 209 interconnect between the crossbar 207 and memory controllers 208 and between the application engines 202 and the memory controllers 208.

In this example, co-processor 22 also includes a direct input/output (I/O) interface 203. Direct I/O interface 203 may be used to allow external I/O to be sent directly into the application engines 22, and then from there, if desired, written into memory system 210. Direct I/O interface 203 of this exemplary embodiment allows a customer to have input or output from co-processor 22 directly to their interface, without going through the host processor's I/O sub-system. In a number of applications, all I/O may be done by the host processor(s) 21, and then potentially written into the co-processor memory 210. An alternative way of bringing input or output from the host system as a whole is through the direct I/O interface 203 of co-processor 22. Direct I/O interface 203 can be much higher bandwidth than the host interface itself. In alternative embodiments, such direct I/O interface 203 may be omitted from co-processor 22.

In operation of the exemplary co-processor 22 of FIG. 2, the application engines 202 are configured to implement the extended instructions for a desired personality. In one embodiment, an image of the extended instructions is loaded into FPGAs of the application engines, thereby configuring the application engines with a corresponding personality. In one embodiment, the personality implements a desired vector processing personality, such as SPV or DPV.

In one embodiment, the host processor(s) 21 executing an application dispatches certain instructions of the application to co-processor 22 for processing. To perform such dispatch, the host processor(s) 21 may issue a write to a memory location being monitored by the host interface 204. In response, the host interface 204 recognizes that the co-processor is to take action for processing the dispatched instruction(s). In one embodiment, host interface 204 reads in a set of cache lines that provide a description of what is suppose to be done by co-processor 22. The host interface 204 gathers the dispatch information, which may identify the specific personality that is desired, the starting address for the routine to be executed, as well as potential input parameters for this particular dispatch routine. Once it has read in the information from the cache, the host interface 204 will initialize the starting parameters in the host interface cache. It will then give the instruction fetch/decode unit 205 the starting address of where it is to start executing instructions, and the fetch/decode unit 205 starts fetching instructions at that location. If the instructions fetched are canonical instructions (e.g., scalar loads, scalar stores, branch, shift, loop, and/or other types of instructions that are desired to be available in all personalities), the fetch/decode unit 205 sends those instructions to the scalar processor 206 for processing; and if the fetched instructions are instead extended instructions of an application engine's personality, the fetch decode unit 205 sends those instructions to the application engines 202 for processing.

Exemplary techniques that may be employed for dispatching instructions of an executable from a host processor 21 to the co-processor 22 for processing in accordance with certain embodiments are described further in co-pending and commonly-assigned U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", the disclosure of which is incorporated herein by reference. For example, as discussed further in U.S. patent application Ser. No. 11/854,432, according to certain embodiments of the present invention, a technique is employed to effectively trick the host processor's instruction set (e.g., the x86 instruction set) to support off-loading to the co-processor an executable's instructions that may not be natively supported by the host processor's instruction set. According to certain embodiments, the instruction set of the host processor (e.g., x86) is fixed and is implemented by the hardware micro-architecture. The host instruction set cannot be modified once a design of the host processor's micro-architecture is completed and manufactured. According to one embodiment of the present invention, the host processor is effectively "tricked" by causing the host processor to store the executable's instructions that are to be off-loaded to the co-processor to a pre-designated portion of memory, which may be referred to herein as a user command block (UCB). The co-processor monitors the UCB to detect when instructions have been stored thereto, and upon detection of instructions in the UCB, the co-processor processes those instructions with the instruction set with which it has been configured. In this manner, when generating a given executable, a compiler can include in the executable instructions that may not be supported by the host processor's instruction set but which are instead intended for processing under a different instruction set (that the co-processor is to be configured to have). The compiler can also include in the executable's instruction stream an instruction to cause the host processor to load certain instructions of the executable (such as those instructions that are intended for processing by the co-processor's instruction set) to the UCB. Such a loading operation is supported by the host processor's native instruction set, although processing of those instructions that it loads to the UCB may not be supported by the host processor's native instruction set.

As mentioned further herein, in certain embodiments, the executable may specify which of a plurality of different personalities the co-processor is to be configured to possess for processing operations of the executable. Exemplary techniques that may be employed for generating and executing such an executable in accordance with certain embodiments of the present invention are described further in co-pending and commonly-assigned U.S. patent application Ser. No. 11/847,169 filed Aug. 29, 2007 titled "COMPILER FOR GENERATING AN EXECUTABLE COMPRISING INSTRUCTIONS FOR A PLURALITY OF DIFFERENT INSTRUCTION SETS", the disclosure of which is incorporated herein by reference. Thus, similar techniques may be employed in accordance with certain embodiments of the present invention for generating an executable that specifies one or more vector processing personalities desired for the co-processor to possess when executing such executable, and for dispatching certain instructions of the executable to the co-processor for processing by its configured vector processing personality.

As the example of FIG. 2 illustrates, embodiments of the present invention provide a co-processor that includes one or more application engines having dynamically-reconfigurable personalities (e.g., vector processing personalities), and the co-processor further includes an infrastructure (e.g., infrastructure 211) that is common across all of the personalities. In certain embodiments, the infrastructure 211 comprises an instruction decode infrastructure that is common across all of the personalities, such as is provided by instruction fetch/decode unit 205 of exemplary co-processor 22 of FIG. 2. In certain embodiments, the infrastructure 211 comprises a memory management infrastructure that is common across all of the personalities, such as is provided by memory controllers 208 and memory 210 of exemplary co-processor 22 of FIG. 2. In certain embodiments, the infrastructure 211 comprises a system interface infrastructure that is common across all of the personalities, such as is provided by host interface 204 of exemplary co-processor 22 of FIG. 2. In addition, in certain embodiments, the infrastructure 211 comprises a scalar processing unit having a base set of instructions that are common across all of the personalities, such as is provided by scalar processing unit 206 of exemplary co-processor 22 of FIG. 2. While the exemplary implementation of FIG. 2 shows infrastructure 211 as including an instruction decode infrastructure (e.g., instruction fetch/decode unit 205), memory management infrastructure (e.g., memory controllers 208 and memory 210), system interface infrastructure (e.g., host interface 204), and scalar processing unit 206 that are common across all of the personalities, the scope of the present invention is not limited to implementations that have all of these infrastructures common across all of the personalities; but rather any combination (one or more) of such infrastructures may be implemented to be common across all of the personalities in a given co-processor in accordance with embodiments of the present invention.

According to one embodiment of the present invention, the co-processor 22 supports at least two general-purpose vector processing personalities. The first general-purpose vector processing personality is referred to as single-precision vector (SPV), and the second general-purpose vector processing personality is referred to as double-precision vector (DPV). These personalities provide extensions to the canonical ISA that support vector oriented operations. The personalities are appropriate for single and double precision workloads, respectively, with data organized as single or multi-dimensional arrays.

Figure 3:
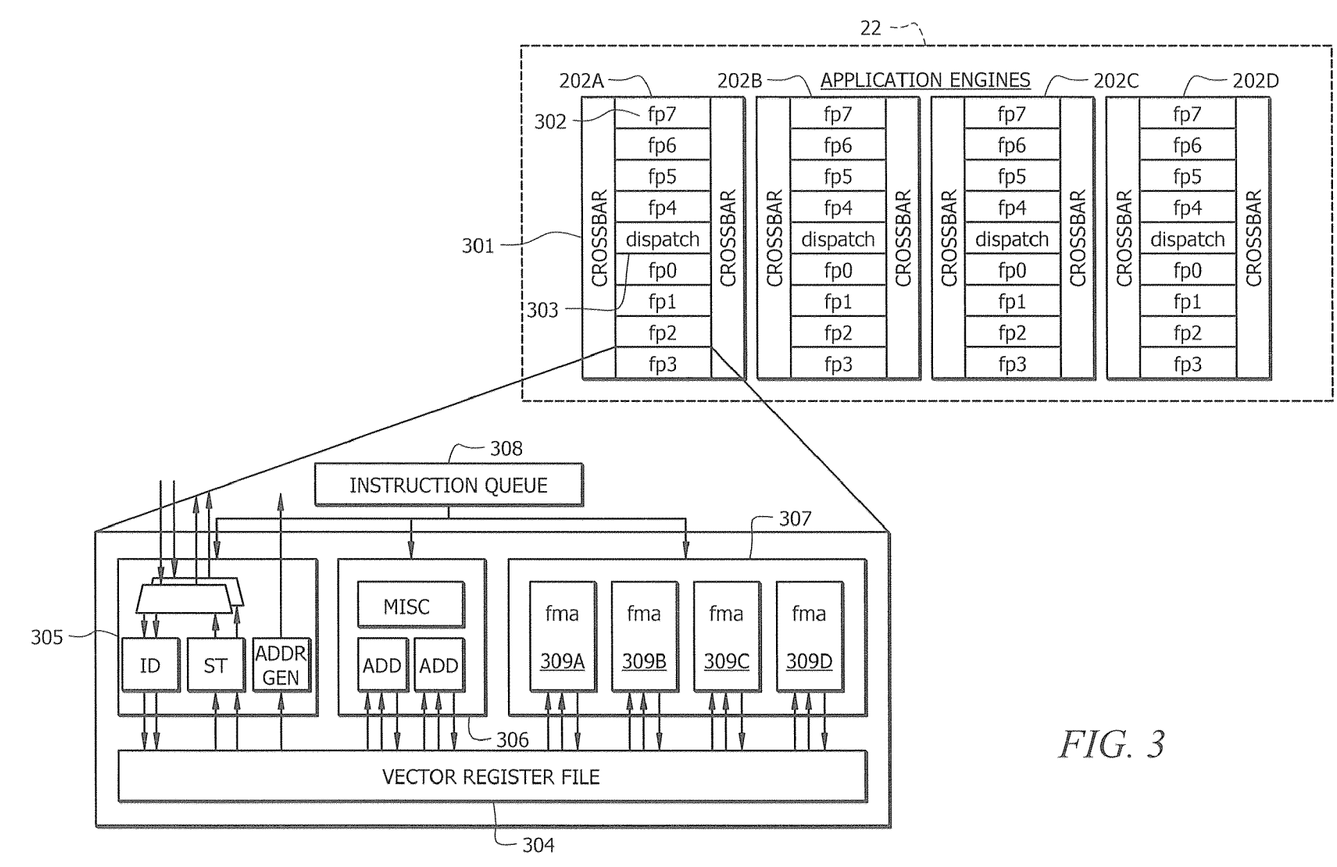
FIG. 3 shows an exemplary implementation of application engines of the co-processor of FIG. 2 being configured to possess a single precision vector (SPY) personality.

An exemplary implementation of application engines 202A-202D of co-processor 22 of FIG. 2 are shown in FIG. 3. In particular, FIG. 3 shows an example in which the application engines 202 are configured to have a single precision vector (SPV) personality. Thus, the exemplary personality of application engines 202 is optimized for a seismic processing application (e.g., oil and gas application) or other type of application that desires single-precision vector processing.

In each application engine, there are function pipes 302. In this example, each application engine has eight function pipes (labeled fp0-fp7). While eight function pipes are shown for each application engine in this illustrative examples the scope of the present invention is not limited to any specific number of function pipes; but rather any number (one or more) of function pipes may be implemented in a given application engine in accordance with embodiments of the present invention. Thus, while thirty-two total function pipes are shown as being implemented across the four application engines in this illustrative example, the scope of the present invention is not limited to any specific number of function pipes; but rather any total number of function pipes may be implemented in a given co-processor in accordance with embodiments of the present invention.

Further, in each application engine, there is crossbar, such as crossbar 301, which is used to communicate or pass memory requests and responses to/from the function pipes 302. Requests from the function pipes 302 go through the crossbar 301 and then to the memory system (e.g., memory controllers 208 of FIG. 2).

The function pipes 302 are where the computation is done within the application engine. Each function pipe receives instructions to be executed from the corresponding application engine's dispatch block 303. For instance, function pipes fp0-fp7 of application engine 202A each receives instructions to be executed from dispatch block 303 of application engine 202A. As discussed further hereafter, each function pipe is configured to include one or more function units for processing instructions. Function pipe fp3 of FIG. 3 is expanded to show more detail of its exemplary configuration in block-diagram form. Other function pipes fp0-fp2 and fp4-fp7 may be similarly configured as discussed below for function pipe fp3.

The instruction queue 308 of function pipe fp3 receives instructions from dispatch block 303. In one embodiment, there is one instruction queue per application engine that resides in the dispatch logic 303 of FIG. 3. The instructions are pulled out of instruction queue 308 one at a time, and executed by the function units within the function pipe fp3. All function units within an application engine perform their functions synchronously. This allows all function units of an application engine to be fed by the application engine's single instruction queue 308. In the example of FIG. 3, there are three function units within the function pipe fp3, labeled 305, 306 and 307. Each function unit in this vector infrastructure performs an operation on one or more vector registers from the vector register file 304, and may then write the result back to the vector register file 304 in yet another vector register. Thus, the function units 305-307 are operable to receive vector registers of vector register file 304 as operands, process those vector registers to produce a result, and store the result into a vector register of a vector register file 304.

In the illustrated example, function unit 305 is a load store function unit, which is operable to perform loading and storing of vector registers to and from memory (e.g., memory 210 of FIG. 2) to the vector register file 304. So, function unit 305 is operable to transfer from the memory 210 (of FIG. 2) to the vector register file 304 or from the vector register file 304 to memory 210. Function unit 306, in this example, provides a miscellaneous function unit that is operable to perform various miscellaneous vector operations, such as shifts, certain logical operations (e.g., XOR), population count, leading zero count, single-precision add, divide, square root operations, etc. In the illustrated example, function unit 307 provides functionality of single-precision vector "floating point multiply and accumulate" (FMA) operations. In this example, four of such FMA operations can be performed simultaneously in the FMA function block 307.

While each function pipe is configured to have one load/store function unit 305, one miscellaneous function unit 306, and one FMA function unit 307 (that includes four FMA blocks), in other embodiments the function pipes may be configured to have other types of function units in addition to or instead of those exemplary function blocks 305-307 shown in FIG. 3. Also, while each function pipe is configured to have three function units 305, 306, and 307 in the example of FIG. 3, in other embodiments the function pipes may be configured to have any number (one or more) of function units.

According to one embodiments the SPV instruction set extensions include the following classes of instructions:
  vector single precision compares;
  vector quad word integer compares;
  vector, single precision ad complex, single loads and stores;
  vector double word and quad word, integer loads and stores;
  vector, single precision and complex single arithmetic operators;
  vector integer negate, add, subtract, and multiply arithmetics;
  vector data type conversions (integer→float, float→integer);
  vector partitioning;
  vector under mask operation;
  vector index generation; and
  vector reductions (min, max, sum).

While illustrative classes of instructions are mentioned above as being included in the SPV personality, it should be recognized that embodiments of the present invention are not limited to the exemplary instruction classes mentioned above. Rather, any number of instruction classes may be implemented for a given vector processing personality in addition to or instead of one or more of the above-mentioned instruction classes.

As discussed further herein, each function unit can be dynamically configurable to possess its corresponding functionality. For instance, a desired extended instruction set image (e.g., single precision vector personality in the example of FIG. 3) is loaded onto the application engines 202A-202D to configure the function units as described in this example. For other personalities, the application engine's function units may be configured differently. For example, the application engine's function units may be reconfigured to implement a double-precision vector processing personality. So, in the exemplary embodiment of FIG. 3, the function units 306 and 307, in particular, may be dynamically reconfigured to implement operations for the desired DPY personality instead of the SPA personality. The application engines may comprise FPGAs or other dynamically configurable logic, such that they can be dynamically configured with any of various different personalities. Thus, in certain embodiments, the dynamic function units are reconfigurable by loading a new personality.

Further, in certain embodiments, any of a plurality of different vector register partitioning modes may be dynamically selected for use by co-processor 22, which may enable co-processor 22 to better support a given vector processing personality. In certain embodiments, the dynamic vector partitioning is selectable by setting a field within a register (without necessarily changing personalities). For instance, a first type of vector register partitioning may be desired for the SPV personality, while a different type of vector register partitioning may be desired for the DPV personality. Or, different types of vector register partitioning may be desired for different operations being performed by a given vector processing personality. And, the vector register partitioning mode may be dynamically selected in certain embodiments, such as disclosed further in concurrently-filed U.S. patent application Ser. No. 12/263,232 titled "DYNAMICALLY-SELECTABLE VECTOR REGISTER PARTITIONING", the disclosure of which is incorporated herein by reference.

According to one embodiment, the DPV instruction set extensions include the following classes of instructions:
  Vector double precision compares
  Vector quad word integer compares
  Vector double precision loads and stores
  Vector double word and quad word, integer load and stores
  Vector double precision arithmetic operators
  Vector integer negate, add, subtract, and multiply arithmetic
  Vector data type conversion (integer→float, float→integer)
  Vector partitioning
  Vector under mask operation
  Vector index generation
  Vector reductions (min, max, sum).

While illustrative classes of instructions are mentioned above as being included in the DPV personality, it should be recognized that embodiments of the present invention are not limited to the exemplary instruction classes mentioned above. Rather, any number of instruction classes may be implemented for a given vector processing personality in addition to or instead of one or more of the above-mentioned instruction classes.

One example of operation of a function unit configured according to a given personality may be a boolean AND operation in which the function unit may pull out two vector registers from the vector register file 304 to be ANDed together. Each vector register may have multiple data elements. In the exemplary architecture of FIG. 3, there are up to 1024 data elements. Each function pipe has 32 elements per vector register. Since there are 32 function pipes that each have 32 elements per vector register, that provides a total of 1024 elements per vector register across all four application engines 202A-202D. Within an individual function pipe, each vector register has 32 elements in this exemplary architecture, and so when an instruction is executed from the instruction queue 308, those 32 elements, if they are all needed, are pulled out and sent to a function unit (e.g., function unit 305, 306, or 307).

As another exemplary operation, in the illustrated example of FIG. 3, FMA function unit 307 may receive as operands two sets of vector registers from vector register file 304. Function unit 307 would perform the requested operation (as specified by instruction queue 308), e.g., either floating point multiply, floating point add, or a combination of multiply and add; and send the result back to a third vector register in the vector register file 304.

While each vector register includes 32 data elements in this illustrative example, the scope of the present invention is not limited to any specific size of vector registers; but rather any size vector registers (possessing two or more data elements) may be used in a given function unit or application engine in accordance with embodiments of the present invention. Further, each vector register may be a one-dimensional, two-dimensional, three-dimensional, or even other "N"-dimensional array of data in accordance with embodiments of the present invention. In addition, in certain embodiments, dynamically selectable vector register partitioning may be employed, such as disclosed in concurrently-filed and commonly-assigned U.S. patent application Ser. No. 12/263,232 titled "DYNAMICALLY-SELECTABLE VECTOR REGISTER PARTITIONING", the disclosure of which is incorporated herein by reference.

In the exemplary architecture of FIG. 3, all of the function pipes fp0-fp7 of each application engine are exact replications. Thus, in the illustrated example, there are thirty-two copies of the function pipe (as shown in detail for fp3 of application engine 202A) across the four application engines 202A-202D, and they are all executing the same instructions because this is a SIMD instruction set. So, one instruction may go into each of the instruction queue(s) of the application engines, and the function pipes all execute the instruction(s) on their respective data. Again, in certain embodiments, there is one instruction queue per application engine.

As mentioned above, the application engines 202 have dynamically configurable personalities, wherein a desired extended instruction set image (e.g., single precision vector personality in the example of FIG. 3) is loaded onto the application engines 202A-202D to configure the function units to provide the functionality as described in this example. For other personalities, such as other vector processing personalities, the application engines' function units may be configured differently. In certain embodiments of the present invention, the co-processor infrastructure is leveraged across multiple vector processing personalities, and the difference between the multiple vector processing personalities that leverage the co-processor infrastructure is the specific operations that are performed in the function units (e.g., function units 305-307) of the application engines 202. In general the load and store function unit 305 may be maintained across various different vector processing personalities, but the operations performed by function units 306 and 307 will vary depending on the specific vector processing personality selected (e.g., SPV, DPV, etc.). For instance, in the SPV personality, function unit 307 is configured to perform single-precision floating multiply accumulate operations, whereas in the DPV personality function unit 307 is configured to perform double-precision type floating multiply accumulate operations.

For a SPV personality, the FMA blocks 309A-309D in function unit 307 all have the same single-precision FMA block in the illustrative example of FIG. 3. So, the FMA blocks 309A-309D are homogeneous in this example. However, it could be that for certain markets or application-types, the customer does not need four FMA blocks (i.e., that may be considered a waste of resources), and so they may choose to implement different operations than four FMAs in the function unit 307. Thus, another vector processing personality may be available for selection for configuring the function units, which would implement those different operations desired. Accordingly, in certain embodiments, the personality of each application engine (or the functionality of each application engine's function units) is dynamically configurable to any of various predefined vector processing personalities that is best suited for whatever the application that is being executed.

Thus, the co-processor infrastructure 211 can be leveraged across multiple different vector processing personalities, with the only change being to reconfigure the operations of the function units within the application engines 202 according to the desired personality. In certain implementations, the co-processor infrastructure 211 may remain constant, possibly implemented in silicon where it is not reprogrammable, but the function units are programmable. And, this provides a very efficient way of having a vector personality with reconfigurable function units.

While certain embodiments of the present invention have been described as employing field-programmable gate arrays within a co-processor to enable the co-processor to be dynamically reconfigured to possess any of a plurality of different personalities (e.g., different vector processing personalities), other configurable logic may be employed in accordance with embodiments of the present invention. For instance, in certain embodiments an application-specific integrated circuit (ASIC) may be employed on the co-processor which may be configurable to possess any of a plurality of different personalities. In certain implementations, the configurable logic (e.g., ASIC) may not be readily field-programmable, but may instead be configured/programmed during manufacturing of the processor system. For instance, a manufacturer may select one or more of various different available vector processing personalities to load onto the configurable logic of the co-processor based, for example, on the targeted market and/or applications to be executed on the processor system. As discussed above, the co-processor infrastructure (e.g., host interface infrastructure, instruction decode infrastructure, and/or memory management infrastructure) can remain common across all of the different personalities. Thus, embodiments of the present invention enable the one configuring the co-processor (whether a manufacturer or other configurer that configures the co-processor personality prior to implementation within a customer system, or dynamic configuration of the co-processor after implemented in a customer system, such as through dynamic configuration to a specific personality identified by a given executable being executed by the customer system) to leverage the common co-processor infrastructure and selectively configure the co-processor to any of a plurality of different personalities (e.g., different vector processing personalities).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing data comprising:
initiating an executable file on a manufactured host processor of a system, said manufactured host processor having a predefined instruction set that is fixed such that it is not modifiable by a consumer, wherein the executable file contains native instructions that are natively supported by the host processor's predefined instruction set and extended instructions that are not natively supported by the host processor's predefined instruction set, wherein said extended instructions are present in the executable file as data to be stored to a memory by one or more of said native instructions;
configuring an application engine of a co-processor of the system, at system run-time, to fully possess a selected one of a plurality of different application-specific personalities, wherein the co-processor has an existing virtual memory and instruction decode infrastructure that is common across all of the plurality of different application-specific personalities, and wherein each of the plurality of different application-specific personalities comprises an extended instruction set having extended instructions that are not natively supported by the host processor's instruction set, thereby extending the fixed instruction set of the host processor; and
processing the instructions of the executable file, wherein said native instructions of the executable file are processed by the host processor and said extended instructions of the executable file are processed by the co-processor, and wherein said host processor unknowingly dispatches said extended instructions of the executable file to the co-processor as a result of executing one or more native instructions of the executable file for writing the extended instructions to a designated portion of said memory that is accessible by said co-processor.

2. The method of claim 1 wherein said configuring comprises configuring at least one field-programmable gate array (FPGA) of said application engine.

3. The method of claim 1 further comprising:
receiving, by the co-processor, reconfiguration information pertaining to the selected personality.

4. The method of claim 3 wherein the receiving is performed dynamically during execution of an application for which the selected application-specific personality is desired.

5. The method of claim 1 wherein the application engine comprises function units that are configurable at system run-time to any of the plurality of different application-specific personalities, wherein the function units are compatible with the framework of the infrastructure, said infrastructure including virtual memory, physical memory, instruction structure and a register structure.

6. The method of claim 1 wherein said plurality of personalities comprise a plurality of vector processing personalities.

7. The method of claim 6 wherein said plurality of vector processing personalities comprise at least one of: a single-precision vector processing personality and a double-precision vector processing personality.

8. The method of claim 1 further comprising:
identifying, from information contained in the executable file, the selected one of the plurality of different application-specific personalities for configuring the application engine of the co-processor.

9. The method of claim 1 wherein the host processor is implemented on a first integrated circuit, and wherein the co-processor is implemented external to said first integrated circuit.

10. The method of claim 1 wherein the plurality of different application-specific personalities are mutually-exclusive.

11. The method of claim 10 wherein the plurality of different application-specific personalities are stored to persistent data storage separate from the executable file, and wherein the configuring comprises loading the selected one of the plurality of different application-specific personalities from the persistent data storage to the application engine.

12. A system for processing data comprising:
at least one manufactured host processor having a predefined instruction set that is fixed such that it is not modifiable by a consumer;
a co-processor comprising:
at least one application engine having at least one configurable function unit that is configurable at system run-time to fully possess any of a plurality of different application-specific personalities, wherein each of the plurality of different application-specific personalities comprises an extended instruction set having extended instructions that are not natively supported by the host processor's instruction set, thereby extending the instruction set of the host processor, and
a virtual memory and instruction decode infrastructure common to all the plurality of different application-specific personalities; and
wherein said manufactured host processor and said co-processor are operable to execute an executable file that contains both native instructions that are natively supported by the host processor's instruction set and extended instructions that are not natively supported by the host processor's instruction set, wherein said extended instructions are present in the executable file as data to be written to a memory by one or more of said native instructions, whereby said native instructions of the executable file are processed by the host processor and said host processor unknowingly dispatches extended instructions of the executable file to the co-processor for processing as a result of said host processor executing one or more native instructions of the executable file for writing the extended instructions to a designated portion of said memory that is accessible by said co-processor.

13. The system of claim 12 wherein the plurality of different application-specific personalities comprise a plurality of different vector processing personalities.

14. The system of claim 13 wherein said plurality of different vector processing personalities comprise at least one of: a single-precision vector processing personality and a double-precision vector processing personality.

15. A co-processor comprising:
a system interface infrastructure for interfacing with a manufactured host processor that has a predefined instruction set that is fixed such that the predefined instruction set is not modifiable by a consumer,
at least one application engine having at least one configurable function unit that is configurable at system run-time to fully possess any of a plurality of different, mutually-exclusive application-specific vector processing personalities, wherein each of the plurality of application-specific vector processing personalities comprises an extended instruction set having extended instructions that are not natively supported by the host processor's instruction set, thereby extending the fixed instruction set of the host processor;

a co-processor infrastructure common to all the plurality of different application-specific vector processing personalities; and wherein said co-processor is operable with said manufactured host processor to execute an executable file that contains both native instructions that are natively supported by the host processor's instruction set and extended instructions that are not natively supported by the host processor's instruction set, wherein said extended instructions are present in the executable file as data to be written to a memory by one or more of said native instructions, whereby said native instructions of the executable file are processed by the host processor and said extended instructions of the executable file are processed by the co-processor.

16. The co-processor of claim 15 wherein the co-processor infrastructure comprises:

a memory management infrastructure, where said memory management infrastructure is common to all the plurality of different application-specific vector processing personalities.

17. The co-processor of claim 15 wherein said system interface infrastructure is common to all the plurality of different application-specific vector processing personalities.

18. The co-processor of claim 15 wherein the co-processor infrastructure comprises:

an instruction decode infrastructure, where said instruction decode infrastructure is common to all the plurality of different application-specific vector processing personalities.

19. The co-processor of claim 15 wherein the co-processor infrastructure comprises:

a scalar processing unit that comprises a fixed set of instructions, where said scalar processing unit is common to all the plurality of different application-specific vector processing personalities.

20. The co-processor of claim 15 wherein the co-processor infrastructure comprises:

a memory management infrastructure, said system interface infrastructure for interfacing with said host processor, and an instruction decode infrastructure that are common to all the plurality of different application-specific vector processing personalities.

21. The co-processor of claim 20 wherein the co-processor infrastructure further comprises:

a scalar processing unit that comprises a fixed set of instructions, where said scalar processing unit is common to all the plurality of different application-specific vector processing personalities.

22. The co-processor of claim 15 wherein said plurality of different application-specific vector processing personalities comprise at least one of: a single-precision vector processing personality and a double-precision vector processing personality.

23. The co-processor of claim 15 wherein the manufactured host processor is implemented on a first integrated circuit, and the co-processor is implemented external to the first integrated circuit.

24. The co-processor of claim 15 wherein a selected one of the plurality of different application-specific vector processing personalities is identified, from information contained in the executable file, for configuring the at least one configurable function unit of the co-processor.

25. A system comprising:

a host processor having a predefined fixed instruction set; and a co-processor, said co-processor including at least one configurable function unit that is configurable at system run-time to fully possess any of a plurality of different, mutually-exclusive vector processing personalities, wherein each of the plurality of different vector processing personalities comprises an extended instruction set having extended instructions that are not natively supported by the host processor's instruction set, thereby extending the predefined fixed instruction set of the host processor, and a virtual memory and instruction decode infrastructure that is common to all the plurality of different vector processing personalities;

wherein an executable file executing on said host processor contains both native instructions that are natively supported by the host processor's instruction set and extended instructions that are not natively supported by the host processor's instruction set, and wherein said extended instructions are present in the executable file as data to be written by one or more of said native instructions to a memory that is accessible by said co-processor.

26. The system of claim 25 wherein said plurality of different vector processing personalities comprise at least one of: a single-precision vector processing personality and a double-precision vector processing personality.

27. The system of claim 25 wherein said co-processor is operable with said manufactured host processor to execute said executable file.

28. The system of claim 27 wherein writing the extended instructions by the one or more native instructions to said memory causes the host processor to unknowingly dispatch said extended instructions to said co-processor.

29. The system of claim 28 wherein said native instructions cause the host processor to load said extended instructions to a pre-designated portion of said memory that is accessible by said co-processor.

30. A system comprising:

a manufactured host processor having a predefined fixed instruction set that is not modifiable by a consumer;

a dynamically reconfigurable co-processor comprising reconfigurable function units that can be dynamically configured, at system run-time, to fully possess any selected one of a plurality of different, mutually-exclusive vector processing personalities for performing corresponding operations of the selected vector processing personality, wherein each of the plurality of different vector processing personalities comprises an extended instruction set having extended instructions that are not natively supported by the host processor's instruction set, thereby extending the fixed instruction set of the host processor;

said dynamically reconfigurable co-processor further comprising an infrastructure that is common to all the plurality of different vector processing personalities;

wherein said dynamically reconfigurable co-processor is operable with said manufactured host processor to execute an executable file that contains both native instructions that are natively supported by the host processor's instruction set and extended instructions that are not natively supported by the host processor's instruction set, wherein said extended instructions are present in the executable file as data to be loaded to a memory by one or more of said native instructions; and wherein the executable file contains native instructions that when executed by the host processor causes the host processor to unknowingly dispatch said extended instructions to said co-processor by loading the extended instructions to a pre-designated portion of said memory that is accessible by said co-processor.

31. The system of claim 30 wherein the infrastructure comprises:
a memory management infrastructure, a system interface infrastructure for interfacing with said host processor, and an instruction decode infrastructure that are common to all the plurality of different vector processing personalities.

32. The system of claim 31 wherein the infrastructure further comprises:
a scalar processing unit that comprises a fixed set of instructions, where said scalar processing unit is common to all the plurality of different vector processing personalities.

33. The system of claim 30 wherein said plurality of different vector processing personalities comprise at least: a single-precision vector processing personality and a double-precision vector processing personality.

34. A method comprising:
initiating an executable file on a manufactured host processor that has a predefined instruction set that is fixed such that it is not modifiable by a consumer, wherein the executable file contains native instructions that are natively supported by the host processor's predefined instruction set and extended instructions that are not natively supported by the host processor's predefined instruction set, wherein said extended instructions are present in the executable file as data to be written by one or more of said native instructions to a designated portion of a memory that is accessible by a reconfigurable co-processor;
configuring said reconfigurable co-processor to fully possess a selected one of a plurality of different, mutually-exclusive vector processing personalities for processing a portion of the instructions of the executable file, wherein each of the plurality of different predefined vector processing personalities comprises an extended instruction set having extended instructions that are not natively supported by the host processor's instruction set, thereby extending the fixed instruction set of the host processor;
processing the instructions of the executable file, wherein said native instructions of the executable file are processed by the host processor and said extended instructions of the executable file are processed by the reconfigurable co-processor.

35. The method of claim 34 wherein said plurality of different vector processing personalities comprise at least: a single-precision vector processing personality and a double-precision vector processing personality.

36. The method of claim 34 wherein the manufactured host processor is implemented on a first integrated circuit, and wherein the co-processor is implemented external to said first integrated circuit.

37. A method comprising:
initiating an executable file on a manufactured host processor that has a predefined instruction set that is fixed such that it is not modifiable by a consumer, wherein the executable file contains native instructions that are natively supported by the host processor's predefined instruction set and extended instructions that are not natively supported by the host processor's predefined instruction set, wherein said extended instructions are present in the executable file as data to be written by one or more of said native instructions to a memory;
determining one of a plurality of different, mutually-exclusive vector processing personalities to load to a dynamically reconfigurable co-processor for processing a portion of the instructions of the executable file, wherein the determined vector processing personality defines an extended instruction set that comprises instructions for performing vector oriented operations that are not natively supported by the host processor's predefined instruction set, thereby extending the host processor's instruction set;
when determined that the determined vector processing personality is not present on the dynamically reconfigurable co-processor, fully loading, at system run-time, the determined vector processing personality to the dynamically reconfigurable co-processor; and
processing the instructions of the executable file, wherein the native instructions of the executable file are processed by the host processor and the extended instructions of the executable file are processed by the dynamically reconfigurable co-processor, wherein said host processor unknowingly dispatches said extended instructions of the executable file to the co-processor as a result of executing one or more native instructions of the executable file for writing the extended instructions to a designated portion of said memory that is accessible by said co-processor.

38. The method of claim 37 wherein said plurality of different vector processing personalities comprise at least: a single-precision vector processing personality and a double-precision vector processing personality.

39. The method of claim 37 wherein the manufactured host processor is implemented on a first integrated circuit, and wherein the co-processor is implemented external to said first integrated circuit.

40. A system comprising:
a manufactured host processor implemented on a first integrated circuit and comprising a predefined fixed instruction set that is not modifiable by a consumer; and
a co-processor implemented external to said first integrated circuit and comprising reconfigurable logic for dynamically reconfiguring the co-processor to possess any of a plurality of different vector processing personalities, wherein each of said plurality of different vector processing personalities comprises an extended instruction set providing extended instructions not natively supported by the host processor's instruction set, thereby extending the host processor's instruction set; and
wherein said manufactured host processor and said co-processor are operable to execute an executable file that contains both native instructions that are natively supported by the host processor's instruction set and extended instructions that are not natively supported by the host processor's instruction set, wherein said extended instructions are present in the executable file as data to be written by one or more of said native instructions to a memory, whereby said host processor unknowingly dispatches said extended instructions of the executable file to the co-processor as a result of executing one or more native instructions of the executable file for writing the extended instructions to a designated portion of said memory that is accessible by said co-processor.

41. The system of claim 40 wherein said host processor and said co-processor share a common virtual address space.

42. The system of claim 41 further comprising:
each of said host processor and said co-processor comprising a respective local cache, wherein cache coherency is maintained between the host processor and co-processor.

43. The system of claim 40 further comprising:
said executable file, wherein said native instructions are for processing by said host processor and said extended instructions are for processing by said co-processor.

44. The system of claim 43 wherein all memory addresses for all of said native and extended instructions in the executable are virtual addresses.

* * * * *